US008485329B1

(12) United States Patent
Roy et al.

(10) Patent No.: US 8,485,329 B1
(45) Date of Patent: Jul. 16, 2013

(54) LUGGAGE BAG HAVING A HANDLE INCORPORATING A SCALE FOR WEIGHING THE BAG

(76) Inventors: Liliane Roy, Tampa, FL (US); Pierre Berryer, North Miami, FL (US)

(*) Notice: Subject to any disclaimer, the term of this patent is extended or adjusted under 35 U.S.C. 154(b) by 552 days.

(21) Appl. No.: 12/799,603

(22) Filed: Apr. 28, 2010

(51) Int. Cl.
*A45C 13/28* (2006.01)
*G01G 19/58* (2006.01)

(52) U.S. Cl.
USPC .......................................... 190/116; 177/149

(58) Field of Classification Search
USPC ...................... 177/131, 148, 149; 190/116
See application file for complete search history.

(56) References Cited

U.S. PATENT DOCUMENTS

| 812,830 A | * | 2/1906 | Dahlman | 177/149 |
| 2,710,083 A | * | 6/1955 | White | 190/102 |
| 2,759,577 A | * | 8/1956 | White | 190/102 |
| 7,271,353 B1 | * | 9/2007 | Lewis | 177/131 |
| 7,281,615 B2 | | 10/2007 | Siwak et al. | |
| 2006/0207850 A1 | | 9/2006 | Lewis | |
| 2007/0007048 A1 | | 1/2007 | Gill | |
| 2007/0045011 A1 | | 3/2007 | Dittrich et al. | |

FOREIGN PATENT DOCUMENTS

GB    2385142 A    8/2003

* cited by examiner

*Primary Examiner* — Tri Mai
(74) *Attorney, Agent, or Firm* — Ronald V. Davidge

(57) ABSTRACT

A luggage bag includes a handle fastened to a carrying case by an attachment member at each end. Each of the attachment members is held against a motion limiting surface within the handle by a compression spring, at a position in which the attachment member can be latched for carrying the bag or released to measure the weight of the bag. The weight of the bag is determined by the position of an indicator moving with one of the attachment members on a scale moving with the other attachment member.

13 Claims, 3 Drawing Sheets

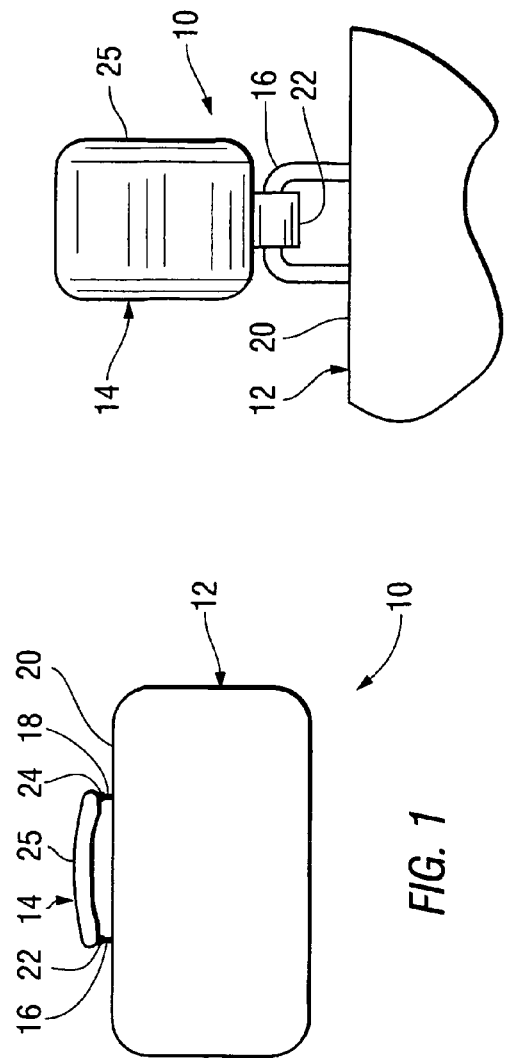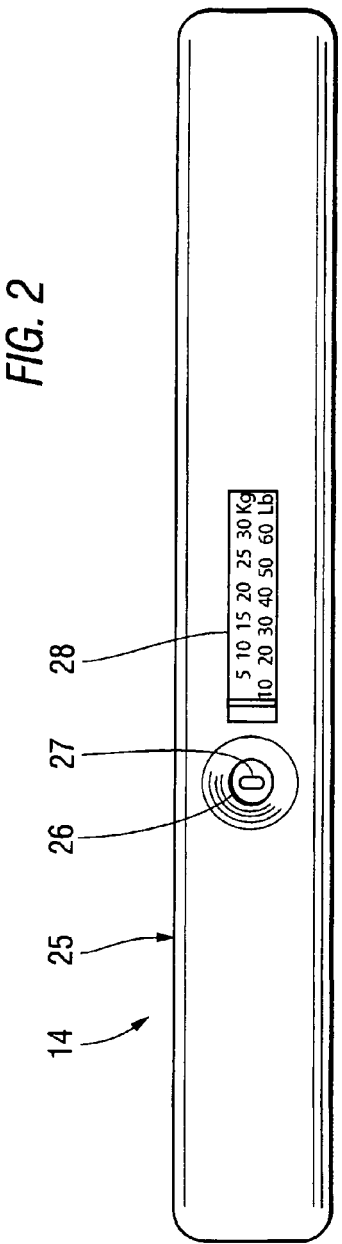

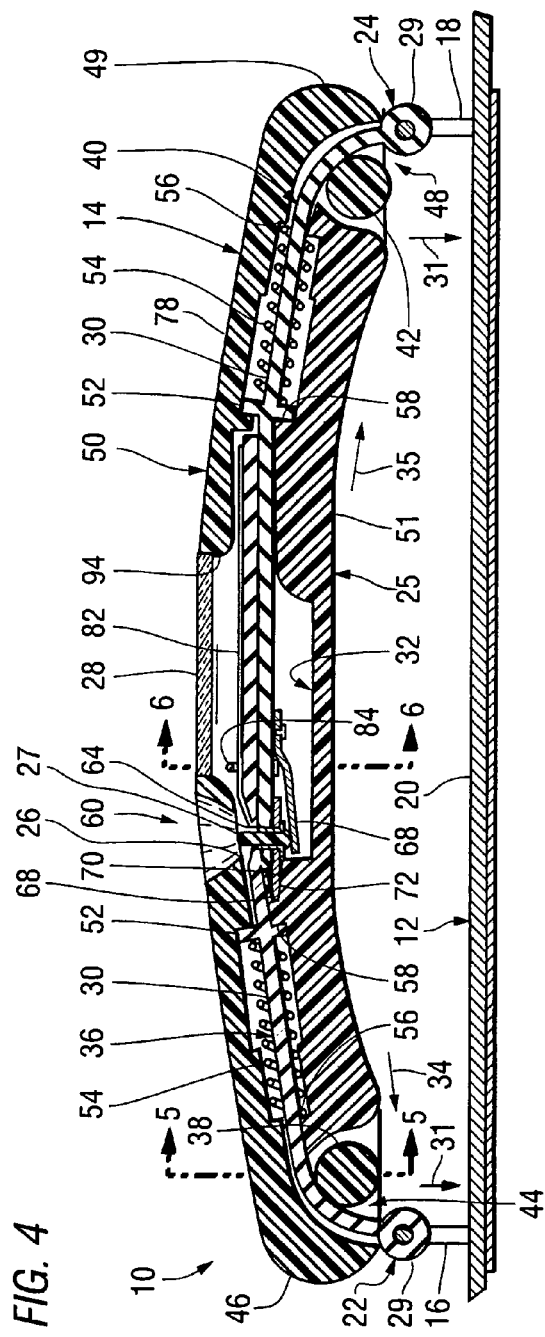
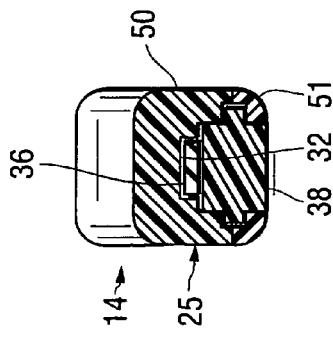
FIG. 4
FIG. 5
FIG. 6

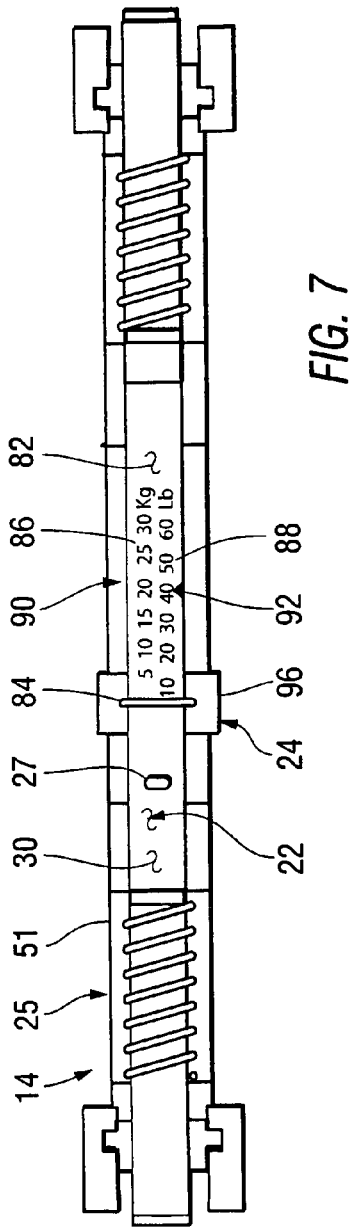
FIG. 7
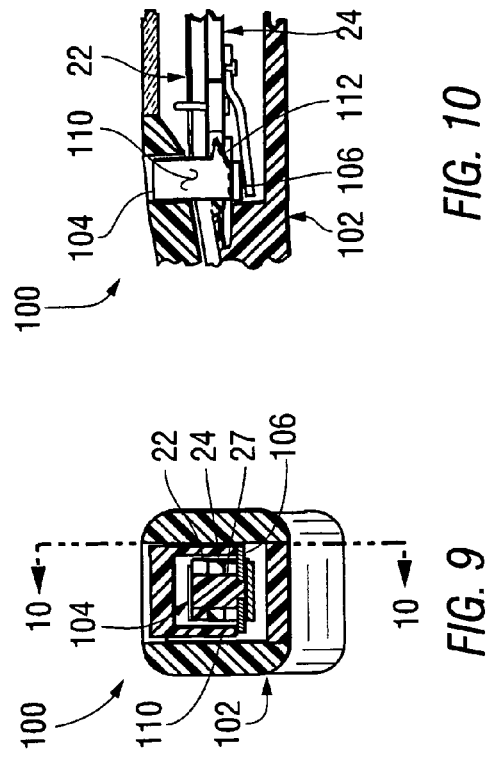
FIG. 8
FIG. 9
FIG. 10

LUGGAGE BAG HAVING A HANDLE INCORPORATING A SCALE FOR WEIGHING THE BAG

RELATED APPLICATIONS

Not Applicable

FEDERALLY SPONSORED RESEARCH OR DEVELOPMENT

Not Applicable

BACKGROUND OF THE INVENTION

1. Field of the Invention

This invention relates to an apparatus for weighing a luggage bag and, more particularly, to such an apparatus incorporated within a handle of the luggage bag.

2. Summary of the Background Information

Since most airlines within the United States and other countries now charge substantial fees for overweight luggage, there is a great need for a portable scale for weighing luggage bags. While it is often easy enough to weigh luggage bags at home on a bathroom scale before leaving for an airport, it is generally difficult to find a scale suitable for this purpose after leaving home, so that luggage bags to be carried on return or continuing flights, often filled with additional items purchased during a trip, are weighed for the first time on the scale at an airport ticket counter. At this point, with a tight schedule to reach a departing flight and a long line of passengers waiting to check baggage, it is particularly difficult to rearrange items in luggage to be checked or carried to eliminate or minimize fees for excess baggage weight.

The patent literature includes a number of descriptions of portable devices for weighing luggage bags. For example, a scale including a digital readout is built into a separate handle from which a hook-shaped cradle descends. The handle of a bag to be weighed is placed in the cradle to be lifted for weighing. In another device, an electronic, mechanical, or strain gauge weight sensing system is held under the handle of the luggage bag, with a weight being displayed by an LED device as the bag is lifted. In yet another device, a scale is built into the luggage bag, using an electrical signal derived from a strain gauge mounted at the center of a plate within the carrying case of the bag, with a handle outside the carrying case being attached to each end of the plate, and with the weight of the bag being digitally displayed on the handle.

Other weighing devices are incorporated entirely into the handles of luggage bags. One method for doing this includes a flexible resistance element mounted within the handle to bend as the bag is lifted, and a mechanism for determining the weight of the bag from the flexure of the resistance element, with the weight being digitally displayed on the handle. Other bag handles include built-in weighing devices that measure the forces provided by the attachment of the carrying case at each end of the handle. A problem with using the handle in this way arises from the fact that the total weight of the bag must be derived as the sum of two inputs by summing electrical signals or by connecting springs so that an output point is moved through a distance according to input forces occurring at two separate points.

What is needed is a simple mechanism for determining the weight of a luggage bag from an input force at each end of a handle, without incurring the expense of the transducers and circuitry needed to provide and analyze electrical input signals.

SUMMARY OF THE INVENTION

In accordance with a first aspect of the invention, a luggage bag is provided with a handle fastened to a carrying case for holding articles to be transported by a pair of attachment members, with the handle including a scale indicating the weight of the carrying case. The luggage bag includes the carrying case, a handle housing, first and second attachment members, first and second springs, an index member, and an indicating member. The carrying case includes an upper side having first and second attachment structures spaced apart along the upper side. The handle housing has first and second ends and a viewing aperture. Each of the attachment members includes an outer portion, extending outward from an end of the handle housing and attached to an attachment point of the carrying case, and an inner portion, extending within the handle housing past the viewing aperture. The outer portion of each attachment member is mounted to move outward from the handle housing, while the inner portion of each attachment member is mounted to move longitudinally within the handle housing. The inner portion is connected to the outer portion to move in a first longitudinal direction as the outer portion is moved outward from the handle housing. The first spring connects the first attachment member to the handle housing to provide a force opposing movement of the inner portion of the first attachment member in its first longitudinal direction, while the second spring connects the second attachment member to the handle housing to provide a force opposing movement of the inner portion of the second attachment member opposite its first longitudinal direction. The index member extends along the inner portion of the first attachment member, being visible through the viewing aperture in the handle housing. The indicating member is fastened to the second attachment member to move along the index member, being visible through the viewing aperture in the handle housing.

Preferably, the handle housing additionally includes an end opening at each end with a roller being rotatably attached to the handle housing near each end. Then, each attachment member includes a flexible strap extending outward from the handle housing through an end opening, partly around a roller, and longitudinally within the handle housing from the roller.

Preferably, the handle housing includes an internal cavity having first and second spring retaining surfaces, while the first and second flexible straps each include a spring retaining flange. Then, the first spring is a compression spring extending between the first spring retaining surface of the internal cavity and the spring retaining flange of the first flexible strap, while the second spring is a compression spring extending between the second spring retaining surface of the internal cavity and the spring retaining flange of the second flexible strap.

In accordance with a second aspect of the invention, a latching mechanism is provided for latching both attachment members within the handle housing for carrying the case, with each attachment member extending outward from the handle through a minimum distance. When the latching mechanism is released, the case is weighed, with the attachment members being pulled outward from the handle by the weight of the case. The handle housing additionally comprises motion-limiting surfaces stopping inward movement of the inner portions of the attachment members by engaging motion-limiting surfaces of the attachment members. The latching mechanism is attached to the inner portion of the second attachment member releasably latching the inner portion of the first support member to the inner portion of the second support member with the motion-limiting surface of the first attachment member held adjacent the first motion-limiting surface of the handle housing and with the motion-limiting surface of the second attachment member held adjacent the second motion-limiting surface of the handle housing.

Preferably, the inner portion of the first attachment member includes a latching cavity, while the latching mechanism includes a latching pin, aligned with the latching cavity with the motion-limiting surface of the first attachment member held adjacent the first motion-limiting surface of the handle housing and with the motion-limiting surface of the second attachment member held adjacent the second motion-limiting surface of the handle housing. A latching spring also attached to the inner portion of the second attachment member, moves the latching pin into the engagement with the latching cavity when the latching pin and the latching cavity are aligned with one another.

Preferably, the handle housing includes an outer side, facing away from the carrying case, and an internal cavity having a support ledge. Then, the inner portion of the first attachment member extends within the internal cavity and adjacent the outer side of the handle housing, while the inner portion of the second attachment member extends, within the internal cavity and adjacent the inner portion of the first attachment member, to an end adjacent the support ledge with the second attachment member held adjacent the second motion-limiting surface of the handle housing.

For example, the outer side of the handle housing includes an access hole adjacent the latching cavity of the first attachment member with the motion-limiting surface of the first attachment member held adjacent the first motion-limiting surface of the handle housing, while the latching pin extends through the latching cavity and outward, toward the access hole, with the latching pin held in engagement with the latching cavity. Alternately, the handle housing includes an unlatching button, engaging the latching pin with the first attachment member held adjacent the first motion-limiting surface of the handle housing and with the motion-limiting surface of the second attachment member held adjacent the second motion-limiting surface of the handle housing, with the unlatching button being movable in engagement with the latching pin to move the latching pin out of engagement with the latching cavity.

BRIEF DESCRIPTION OF THE FIGURES

These and other aspects of the invention will be made apparent by reading the following specification in conjunction with the drawings, in which:

FIG. 1 is a side elevation of a luggage bag built in accordance with the present invention;

FIG. 2 is a fragmentary end elevation of the luggage bag of FIG. 1;

FIG. 3 is a plan view of a handle within the luggage bag of FIG. 1;

FIG. 4 fragmentary longitudinal cross-sectional elevation of the luggage bag of FIG. 1;

FIG. 5 is a first transverse cross-sectional elevation of the handle of FIG. 3, taken as indicated by section line 5-5 in FIG. 4;

FIG. 6 is a second transverse cross-sectional elevation of the handle of FIG. 3, taken as indicated by section line 6-6 in FIG. 4;

FIG. 7 is a plan view of the handle of FIG. 3 with an upper member of a housing therein removed to reveal structures therein;

FIG. 8 is a fragmentary longitudinal cross-sectional elevation of a handle including an alternative latching mechanism;

FIG. 9 is a transverse cross-sectional elevation of the handle of FIG. 8, taken as indicated by section line 9-9 therein; and FIG. 10 is a fragmentary longitudinal elevation of the handle of FIG. 8, taken as indicated by section line 10-10 in FIG. 9.

DETAILED DESCRIPTION OF THE INVENTION

External features of a luggage bag 10, made in accordance with the invention to include a carrying case 12 for holding articles to be transported and a handle 14, will first be discussed with reference to FIGS. 1-3. FIG. 1 is a side elevation of a luggage bag 10, while FIG. 2 is a fragmentary end elevation thereof, and while FIG. 3 is a plan view of the handle 14. The carrying case 12 includes a first attachment structure 16 and a second attachment structure 18, spaced apart along an upper side 20 of the carrying case 12. The handle 14 is attached to the carrying case 12 by a first attachment member 22 connected to the first attachment structure 16 of the carrying case 12 and by a second attachment member 24 connected to the second attachment structure 18 thereof. The handle 14 includes a housing 25 having an access hole 26, used to release a latching pin 27 so that the luggage bag 10 can be weighed, with the weight then being displayed within a window 28 in the housing 25.

FIG. 4 is a fragmentary cross-sectional longitudinal elevation of the luggage bag 10, showing structures within the handle 14. Each of the attachment members 22, 24 includes an outer portion 29, extending outward from the handle 14, and an inner portion 30, extending inward, within a cavity 32 in the housing 25 of the handle 14. Within each of the attachment members 22, 24, the outer portion 29 is connected to the inner portion 30, so that, as the outer portion 29 is moved outward, in the direction of arrow 31, the inner portion 30 is moved longitudinally outward, with the inner portion 30 of the first attachment member 24 being moved in the direction of arrow 34, and with the inner portion 30 of the second attachment member 22 being moved in the direction of arrow 35.

Continuing to refer to FIG. 4, and additionally referring to FIG. 5, a transverse cross-sectional elevation of the handle 14, taken as indicated by section line 5-5 in FIG. 4, the first attachment member 22 may be formed as a first flexible strap 36, extending partially around a first roller 38, rotatably mounted in the handle housing 25, while the second attachment member 24 is formed as a second flexible strap 40, extending partly around a second roller 42, additionally rotatably mounted in the handle housing 25. The first flexible strap 36 extends outward from the handle housing 25 through a first opening 44 at a first end 46 of the handle 14, while the second strap extends outward through a second opening 48 and the second end 49 of the handle 14. The handle housing 25 may be an integral part, or it may be a number of parts fastened together with well-known means, such as adhesives or threaded fasteners. In the example of the figures, the housing includes an upper member 50 and a lower member 51, which are arranged to facilitate rotatably mounting the rollers 38, 40 and to facilitate forming the cavity 32.

The inner portion 30 of each of the attachment members 22, 24 is includes a spring retaining flange 52 engaged by a compression spring 54 pushing the inner portion 30 of the first attachment member 22 longitudinally inward, opposite the direction of arrow 34, and pushing the inner portion 30 of the second attachment member 22 longitudinally inward, opposite the direction of arrow 35. The compression spring 54, which extends around the inner portion 30, is held between a spring retaining surface 56 of the cavity 32 within the handle housing 25 and the spring retaining flange 52. The two compression springs 54 have identical spring rates, so that the application of identical forces to the two compression springs 54 produce identical deflections of the two compression springs 54.

When forces are not applied to the outer portions 29 of the attachment members 22, 24 by the weight of the carrying case 12, the compression springs 54 hold the spring retaining flanges 52 against motion-limiting surfaces 58 of the cavity 32 within the handle housing 25, as shown in the figures. The handle 14 includes a latching mechanism 60 holding the attachment members 22, 24 with the spring retaining flanges 52 adjacent the motion-limiting surfaces 58, so that the handle 14 can be used to carry the carrying case 12 without the outer portions 29 of the attachment members 22, 24 being pulled outward, in the direction of arrow 31, by the weight of the carrying case 12.

The latching mechanism 60 includes the latching pin 27, mounted on the second attachment member 24 to be moved into engagement with a latching hole 64 within the first attachment member 22. The latching hole 64 is positioned within the first attachment member 22 to be aligned with the latching pin 27 when the spring retaining flanges 52 are both held adjacent the motion limiting surfaces 58. The latching pin mechanism 60 additionally includes a latching spring 68, attached to the second attachment member 24, moving the latching pin 27 into engagement with the latching hole 64 when the latching pin 27 is aligned with the latching hole 64 and holding the latching pin 27 engaged within the latching hole 64. The cavity 32 in the handle housing 25 includes a support ledge 70 disposed adjacent an end 72 of the second attachment member 24. For example, the second attachment member 24 includes plate 74 forming the end 72 and supporting a bushing 76, in which the latching pin 27 moves.

The handle housing 25 includes an outer side 78, facing away from the carrying case 12, in which the access hole 26 is formed to be adjacent the latching hole 64 when the spring retaining flange 52 of the first attachment member 22 is held adjacent the motion limiting surface 58. The latching mechanism 60 is unlatched by depressing the latching pin 27 through the latching hole 26, allowing the attachment members 22, 24 to move with the application of forces to the outer portions 29 of the attachment members 22, 24, so that the weight of the carrying case 12 can be determined from the relative movement of the attachment members 22, 24.

When the carrying case 12 is lifted using the handle 14, forces applied to the handle 14 by the weight of the carrying case are divided between the outer end portions 29 of the first attachment member 22 and the second attachment member 24. When the latching mechanism 60 is unlatched, the increased distance through which the inner portion 30 of the first attachment member 22 is deflected, longitudinally outward, in the direction of arrow 34 is proportional to an increase in the force applied to the outer portion 29 of the first attachment member 22, while the increased distance through which the inner portion 30 of the second attachment member 24 is deflected, longitudinally outward, in the direction of arrow 35, is proportional to an increase in the force applied to the outer portion 29 of the second attachment member 24. Since the spring rates of the compression springs are equal, an increase in a total force applied by the weight of the carrying case 12 to both of the attachment members 22, 24 is determined by summing the movement of the inner portion 30 of the first attachment member 22 in the longitudinal direction of arrow 34 and the movement or the inner portion 30 of the second attachment member 24 in the longitudinal direction of arrow 35. That is, an increase in the total weight applied by the carrying case can be determined from the relative movement occurring between the inner portions 30 of the two attachment members 22, 24.

A method for displaying the weight of the luggage bag 10 will now be discussed, with continuing reference being made to FIG. 4, and with additional reference being made to FIGS. 6 and 7. FIG. 6 is a transverse cross-sectional end view of the handle 14, taken as indicated by section line 6-6 in FIG. 4, while FIG. 7 is a plan view of the handle 14 with the upper member 50 of the housing 25 removed to reveal the internal structure. In accordance with the present invention, this relative movement of the attachment members 22, 24 is determined by viewing a visible scale 82 extending along the inner portion 30 of the first attachment member 22, together with an indicating member 84 attached to the inner portion 30 of the second attachment member 24 to move along the visible scale 82. For example, the visible scale 82 includes printed indicia 86 indicating the weight of the luggage bag 10 at various locations along the visible scale 82 at which the indicating member 84 would be held by the indicated weight of the bag 10. As shown in the example of FIG. 2, the printed indicia 86 may be formed in a first row 88 indicating such a weight in pounds and a second row 90 indicating such a weight in kilograms. Alternately or additionally, the visible scale 82 may include one or more markings indicating a weight at which an airline baggage weight limit is reached. For example, the visible scale 82 and the indicating member 84 are disposed adjacent a viewing aperture 94, facing away from the carrying case 12, and are covered with a transparent window 28. Preferably, a widened portion 96 of the inner portion 30 of the second attachment member 24 slides within grooves 98 of the housing 25 to maintain a distance between the window 28 and the indicating member 84.

Preferably, the motion limiting surfaces 58 are located so that the compression springs 54 provide sufficient force to move the attachment members 22, 24 into the position in which the latching pin 27 is aligned with the latching hole 64 when the luggage bag 10 is placed on a surface with the handle 14 released, so that the latching mechanism 60 returns to the latched position, as shown in FIG. 4, following the weighing of the luggage bag 10, when the luggage bag 10 is placed on a surface with the handle 14 released. While such an arrangement may make it impossible to provide an accurate indication of particularly low weights for the luggage bag 10, it is noted that weights significantly below the airline weight limits are not considered to be important.

An alternative latching mechanism 100 will now be discussed, with reference being made to FIGS. 8-10. FIG. 8 is a fragmentary longitudinal cross-sectional elevation of a handle 102 including the latching mechanism 100, while FIG. 9 is a transverse cross-sectional elevation thereof, taken as indicated by section line 9-9 in FIG. 8. FIG. 10 is a fragmentary longitudinal cross-sectional elevation thereof, taken as indicated by section line 10-10 in FIG. 9. The handle 102 includes various features of the handle 14, as described above in reference to FIGS. 1-7, with similar parts being accorded like reference numbers. Such similar parts include a first attachment member 22, a second attachment member 24, and compression springs 54 holding flanges 52 of the attachment members 22, 24 against motion-limiting surfaces 58 (as shown in FIG. 4) with a latching pin 27 slidably mounted within the second attachment member 24 aligned with a latching hole 64 within the first attachment member 22.

The alternative latching mechanism 100 additionally includes an unlatching button 104, which engages a crossbar 106 extending outward from the latching pin 27, with the latching pin 27 held in alignment with the latching hole 64, so that the unlatching button 104 can be depressed, in the direction of arrow 108, to move the latching pin 27 out of engagement with the latching hole 64, starting the process of weighing a luggage bag held by the handle 106. Specifically, the unlatching button 104 includes a pair of descending structures 110 extending to the crossbar 106 adjacent opposite sides of the attachment members 22, 24. Preferably, a lower edge 112 of each of the descending structures 110 is inclined so that the unlatching button is pushed upward, opposite the direction of arrow 108, as the latching pin 27 is moved into alignment with the latching hole 64.

While the invention has been described in terms of preferred embodiments with some degree of particularity, it is understood that this description has been given only by way of example, and that many changes can be made without departing from the spirit and scope of the invention, as defined in the appended claims.

What is claimed is:

1. A luggage bag comprising:
   a carrying case for holding articles to be transported: including an upper side having first and second attachment structures spaced apart along the upper side;
   a handle housing including a viewing aperture, an internal cavity having first and second spring retaining surfaces, and first and second ends, with a first end opening at the first end and a second end opening at the second end;
   a first attachment member, comprising a first flexible strap, extending outward from the handle housing through the first end opening, and having an outer portion, extending outward from the first end of the handle housing and attached to the first attachment point of the carrying case, and an inner portion, extending within the handle housing past the viewing aperture, wherein the outer portion of the first attachment member is mounted to move outward from the handle housing, wherein the inner portion of the first attachment member is mounted to move longitudinally within the handle housing, and wherein the inner portion of the first attachment member is connected to the outer portion of the first attachment member to move outward in a longitudinal direction as the outer portion of the first attachment member is moved outward from the handle housing, wherein the first flexible strap additionally includes a spring retaining flange;
   a second attachment member, comprising a second flexible strap, extending outward from the handle housing through the second end opening, and having an outer portion, extending outward from the second end of the handle and attached to the second attachment point of the carrying case, and an inner portion, extending within the handle housing past the viewing aperture, disposed adjacent the inner portion of the first attachment member, wherein the outer portion of the second attachment member is mounted to move outward from the handle housing, wherein the inner portion of the second attachment member is mounted to move longitudinally within the handle housing, and wherein the inner portion of the second attachment member is connected to the outer portion of the second attachment member to move outward in a longitudinal direction as the outer portion of the first attachment member is moved outward, wherein the second flexible strap additionally includes a spring retaining flange;
   a first spring connecting the first attachment member to the handle housing to provide a force opposing movement of the inner portion of the first attachment member in the first longitudinal direction, wherein the first spring is a compression spring extending between the first spring retaining surface of the internal cavity and the spring retaining flange of the first flexible strap;
   a second spring connecting the second attachment member to the handle housing to provide a force opposing movement of the inner portion of the second attachment member opposite the first longitudinal direction, wherein the second spring is a compression spring extending between the second spring retaining surface of the internal cavity and the spring retaining flange of the second flexible strap;
   an index member extending along the inner portion of the first attachment member, wherein the index member is visible through the viewing aperture in the handle housing; and
   an indicating member fastened to the second attachment member to move along the index member, wherein the indicating member is visible through the viewing aperture in the handle housing.

2. The luggage bag of claim 1, additionally comprising
   a first roller, rotatably attached to the handle housing adjacent the first opening, wherein the first flexible strap extends longitudinally from the first roller within the handle housing, around a portion of the first roller, and downward toward the first attachment point of the carrying case from the first roller; and
   a second roller, rotatably attached to the handle housing adjacent the second opening, wherein the second flexible strap extends longitudinally from the second roller within the handle housing, around a portion of the second roller, and downward toward the second attachment point of the carrying case from the second roller.

3. The luggage bag of claim 1, additionally comprising a latching mechanism holding the first and second flexible straps together to prevent relative movement between them.

4. A luggage bag comprising:
   a carrying case for holding articles to be transported; including an upper side having first and second attachment structures spaced apart along the upper side;
   a handle housing, having first and second ends and a viewing aperture;
   a first attachment member having an outer portion, extending outward from the first end of the handle housing and attached to the first attachment point of the carrying case, and an inner portion, extending within the handle housing past the viewing aperture, wherein the outer portion of the first attachment member is mounted to move outward from the handle housing, wherein the inner portion of the first attachment member is mounted to move longitudinally within the handle housing, and wherein the inner portion of the first attachment member is connected to the outer portion of the first attachment member to move outward in a longitudinal direction as the outer portion of the first attachment member is moved outward from the handle housing;
   a second attachment member, having an outer portion, extending outward from the second end of the handle and attached to the second attachment point of the carrying case, and an inner portion, extending within the handle housing past the viewing aperture, disposed adjacent the inner portion of the first attachment member, wherein the outer portion of the second attachment member is mounted to move outward from the handle housing, wherein the inner portion of the second attachment member is mounted to move longitudinally within the handle housing, and wherein the inner portion of the second attachment member is connected to the outer portion of the second attachment member to move outward in a longitudinal direction as the outer portion of the first attachment member is moved outward;

a first spring connecting the first attachment member to the handle housing to provide a force opposing movement of the inner portion of the first attachment member in the first longitudinal direction;

a second spring connecting the second attachment member to the handle housing to provide a force opposing movement of the inner portion of the second attachment member opposite the first longitudinal direction;

an index member extending along the inner portion of the first attachment member, wherein the index member is visible through the viewing aperture in the handle housing;

an indicating member fastened to the second attachment member to move along the index member, wherein the indicating member is visible through the viewing aperture in the handle housing;

a first motion-limiting surface of the handle housing stopping inward movement of the inner portion of the first attachment member by engaging a motion-limiting surface of the first attachment member;

a second motion-limiting surface of the handle housing stopping inward movement of the inner portion of the second attachment member by engaging a motion-limiting surface of the second attachment member; and a latching mechanism attached to the inner portion of the second attachment member releasably latching the inner portion of the first support member to the inner portion of the second support member with the motion-limiting surface of the first attachment member held against the first motion-limiting surface of the handle housing and with the motion-limiting surface of the second attachment member held adjacent the second motion-limiting surface of the handle housing.

5. The luggage bag of claim 4, wherein
the inner portion of the first attachment member includes a latching cavity,
the latching mechanism includes a latching pin, aligned with the latching cavity with the with the motion-limiting surface of the first attachment member held adjacent the first motion-limiting surface of the handle housing and with the motion-limiting surface of the second attachment member held adjacent the second motion-limiting surface of the handle housing, and a latching spring moving the latching pin into the engagement with the latching cavity when the latching pin and the latching cavity are aligned with one another.

6. The luggage bag of claim 5, wherein
the handle housing includes an outer side, facing away from the carrying case, and an internal cavity having a support ledge,
the inner portion of the first, attachment member extends within the internal cavity and adjacent the outer side of the handle housing,
the inner portion of the second attachment member extends, within the internal cavity and adjacent the inner portion of the first attachment member, to an end adjacent the support ledge with the second attachment member held adjacent the second motion-limiting surface of the handle housing.

7. The luggage bag of claim 6, wherein
the outer side of the handle housing includes an access hole adjacent the latching cavity of the first attachment member with the motion-limiting surface of the first attachment member held adjacent the first motion-limiting surface of the handle housing, and
the latching pin extends through the latching cavity and outward, toward the access hole, with the latching pin held in engagement with the latching cavity.

8. The luggage bag of claim 6, wherein
the handle housing includes an unlatching button, engaging the latching pin with the first attachment member held adjacent the first motion-limiting surface of the handle housing and with the motion-limiting surface of the second attachment member held adjacent the second motion-limiting surface of the handle housing, and
the unlatching button is movable in engagement with the latching pin to move the latching pin out of engagement with the latching cavity.

9. A luggage bag comprising:
a carrying case for holding articles to be transported; including an upper side having first and second attachment structures spaced apart along the upper side;
a handle housing, having first and second ends;
a first attachment member having an outer portion, extending outward from the first end of the handle housing and attached to the first attachment point of the carrying case, and an inner portion, extending within the handle housing past the viewing aperture, wherein the outer portion of the first attachment member is mounted to move outward from the handle housing, wherein the inner portion of the first attachment member is mounted to move longitudinally within the handle housing, and wherein the inner portion of the first attachment member is connected to the outer portion of the first attachment member to move outward in a longitudinal direction as the outer portion of the first attachment member is moved outward from the handle housing;
a second attachment member, having an outer portion, extending outward from the second end of the handle and attached to the second attachment point of the carrying case, and an inner portion, extending within the handle housing past the viewing aperture, disposed adjacent the inner portion of the first attachment member, wherein the outer portion of the second attachment member is mounted to move outward from the handle housing, wherein the inner portion of the second attachment member is mounted to move longitudinally within the handle housing, and wherein the inner portion of the second attachment member is connected to the outer portion of the second attachment member to move outward in a longitudinal direction as the outer portion of the first attachment member is moved outward;
a first spring connecting the first attachment member to the handle housing to provide a force opposing movement of the inner portion of the first attachment member in the first longitudinal direction;
a second spring connecting the second attachment member to the handle housing to provide a force opposing movement of the inner portion of the second attachment member opposite the first longitudinal direction;
structures attached to the inner portions of the first and second attachment members providing a visual indication of relative movement between the inner portions;
a first motion-limiting surface of the handle housing stopping inward movement of the inner portion of the first attachment member by engaging a motion-limiting surface of the first attachment member;

a second motion-limiting surface of the handle housing stopping inward movement of the inner portion of the second attachment member by engaging a motion-limiting surface of the second attachment member, and a latching mechanism attached to the inner portion of the second attachment member releasably latching the inner portion of the first support member to the inner portion of the second support member with the motion-limiting surface of the first attachment member held adjacent the first motion-limiting surface of the handle housing and with the motion-limiting surface of the second attachment member held adjacent the second motion-limiting surface of the handle housing.

10. The luggage bag of claim 9, wherein the inner portion of the first attachment member includes a latching cavity, the latching mechanism includes a latching pin, aligned with the latching cavity with the with the motion-limiting surface of the first attachment member held adjacent the first motion-limiting surface of the handle housing and with the motion-limiting surface of the second attachment member held adjacent the second motion-limiting surface of the handle housing, and a latching spring moving the latching pin into the engagement with the latching cavity when the latching pin and the latching cavity are aligned with one another.

11. The luggage bag of claim 10, wherein the handle housing includes an outer side, facing away from the carrying case, and an internal cavity having a support ledge, the inner portion of the first attachment member extends within the internal cavity and adjacent the outer side of the handle housing, the inner portion of the second attachment member extends, within the internal cavity and adjacent the inner portion of the first attachment member, to an end adjacent the support ledge with the second attachment member held adjacent the second motion-limiting surface of the handle housing.

12. The luggage bag of claim 11, wherein the outer side of the handle housing includes an access hole adjacent the latching cavity of the first attachment member with the motion-limiting surface of the first attachment member held adjacent the first motion-limiting surface of the handle housing, and the latching pin extends through the latching cavity and outward, toward the access hole, with the latching pin held in engagement with the latching cavity.

13. The luggage bag of claim 11, wherein the handle housing includes an unlatching button, engaging the latching pin with the first attachment member held adjacent the first motion-limiting surface of the handle housing and with the motion-limiting surface of the second attachment member held adjacent the second motion-limiting surface of the handle housing, the unlatching button is movable in engagement with the latching pin to move the latching pin out of engagement with the latching cavity.

\* \* \* \* \*